United States Patent [19]

Balz

[11] 4,383,967
[45] May 17, 1983

[54] AUTOMATIC FINISHING CHIP PROCESS

[75] Inventor: Gunther W. Balz, Kalamazoo, Mich.

[73] Assignee: Roto-Finish Company, Inc., Kalamazoo, Mich.

[21] Appl. No.: 394,256

[22] Filed: Jul. 1, 1982

Related U.S. Application Data

[62] Division of Ser. No. 212,754, Dec. 4, 1980, Pat. No. 4,349,327.

[51] Int. Cl.³ ............................................. B29C 5/04
[52] U.S. Cl. .................................. 264/310; 51/298; 264/224; 264/293; 264/313
[58] Field of Search ............... 264/224, 293, 310, 313; 425/436; 51/298

[56] References Cited

U.S. PATENT DOCUMENTS

| | | | |
|---|---|---|---|
| 1,751,430 | 3/1930 | Thomson | 264/297 |
| 2,415,711 | 2/1947 | Sticelber | 425/426 |
| 2,593,705 | 4/1952 | Sticelber | 425/426 |
| 2,729,855 | 1/1956 | Titus et al. | 264/297 |
| 3,503,725 | 3/1970 | Leipold | 51/298 |
| 3,549,341 | 12/1970 | Kittredge | 51/293 |
| 3,646,713 | 3/1972 | Marshall | 264/144 |
| 3,981,955 | 9/1976 | Otani et al. | 264/310 |
| 4,044,161 | 8/1977 | Tanara | 425/440 |
| 4,068,993 | 1/1978 | Dacey | 425/439 |
| 4,315,885 | 2/1982 | Lemelson | 264/313 |

Primary Examiner—Donald E. Czaja
Assistant Examiner—W. Thompson
Attorney, Agent, or Firm—Gordon W. Hueschen

[57] ABSTRACT

A method of producing finishing chips comprising the steps of providing a castable mixture of particulate abrasive grains and a solidifiable matrix, depositing the mixture into cavities of a generally-cylindrical, flexible mold having a plurality of cavities in the interior surface thereof conforming to the desired configuration of finishing chips to be produced, rotating said cylindrical mold during solidification of said mixture and the production of solid finishing chips within said cavities, and ejecting said solidified finishing chips from said mold by bringing said mold to an inside-out position, whereby said solidified finishing chips are ejected from said cavities, is disclosed. Apparatus which may be employed in carrying out the method, representatively comprising a generally-cylindrical chamber supported on a hollow shaft which is mounted for rotation, a flexible mold disposed within said chamber, and means associated with the bottom of said mold and operative through and within said hollow shaft for positioning said mold in chip-molding location within said chamber or in inside-out chip-ejecting location outside of said chamber, is also disclosed.

20 Claims, 8 Drawing Figures

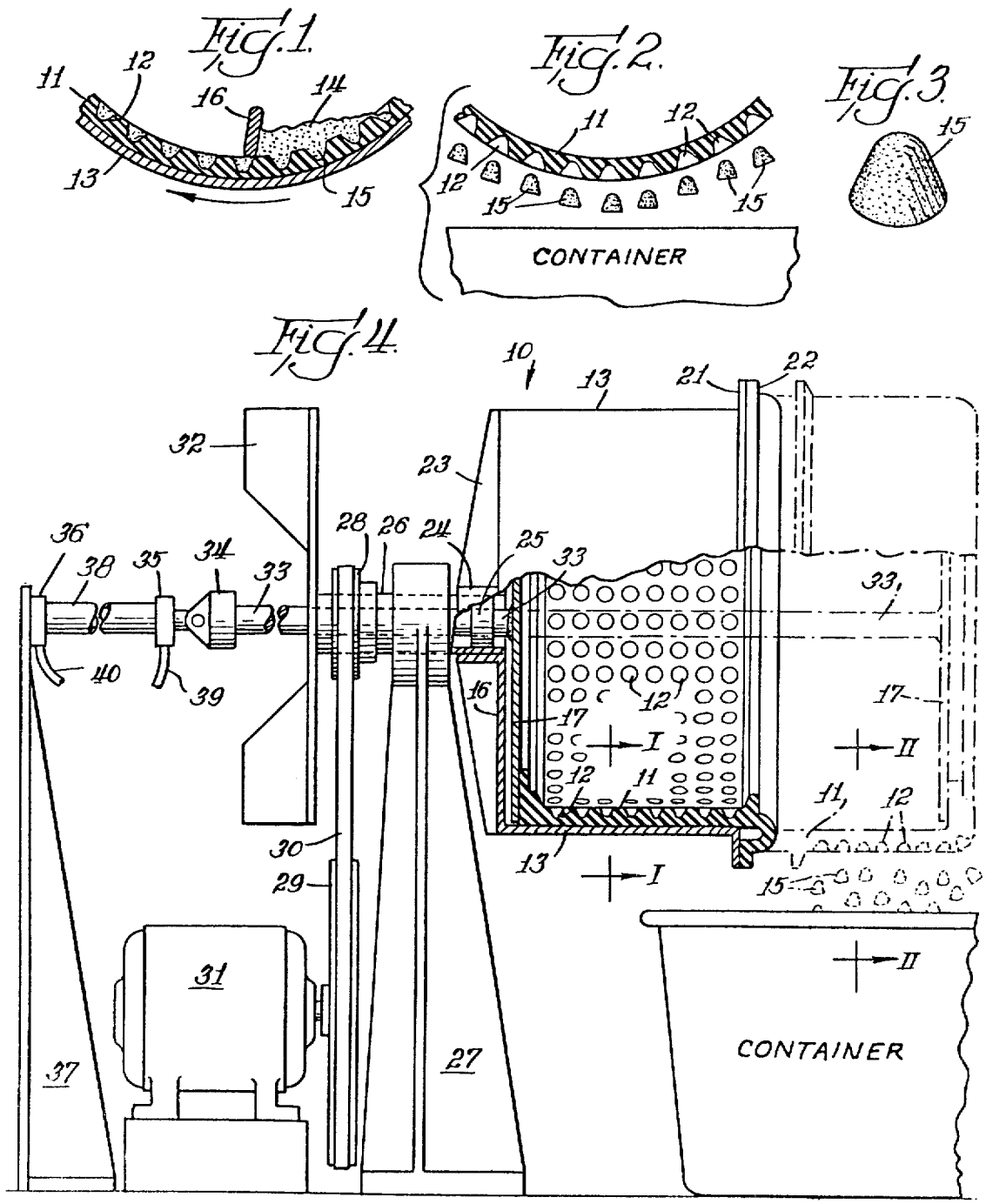

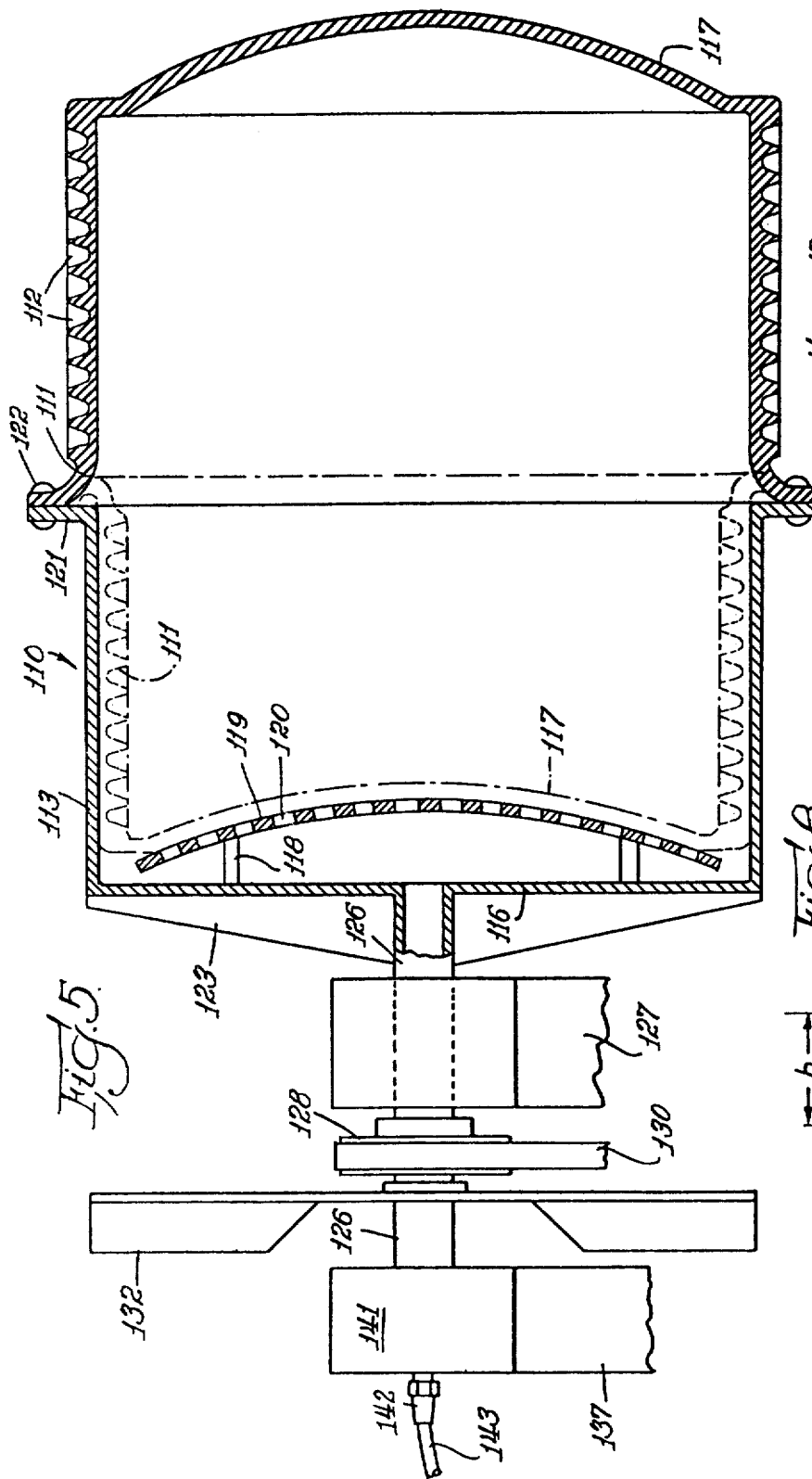
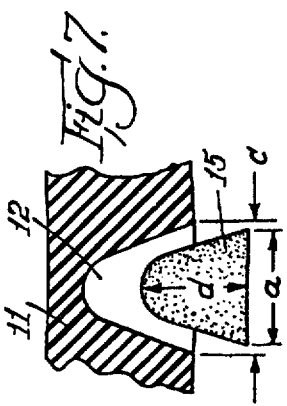
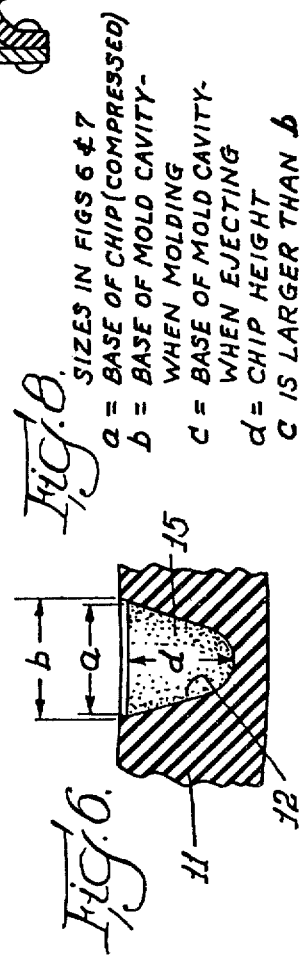
SIZES IN FIGS 6 & 7
a = BASE OF CHIP (COMPRESSED)
b = BASE OF MOLD CAVITY — WHEN MOLDING
c = BASE OF MOLD CAVITY — WHEN EJECTING
d = CHIP HEIGHT
c IS LARGER THAN b

AUTOMATIC FINISHING CHIP PROCESS

This is a division of application Ser. No. 212,754, filed Dec. 4, 1980, now U.S. Pat. No. 4,349,327, issued Sept. 14, 1982.

BACKGROUND OF THE INVENTION

(1) Field of Invention

Tumbling media, finishing media, or finishing "chips" for use in the finishing of parts or workpieces by intimate contact therewith in a finishing chamber according to centrifugal, vibratory, gyratory, or rotatory motion, or combinations thereof; production of such finishing media or chips; apparatus for production thereof; method for the production thereof.

(2) Prior Art

The mechanical finishing industry utilizes a wide variety of tumbling media, finishing media, or finishing "chips," in a multitude of shapes and forms, for the surface refinement and/or deburring of parts of workpieces which are usually of metal or plastic. The procedures employed for such surface refinement include centrifugal, vibratory, gyratory, and rotational procedures, and combinations thereof. In the initial stages of the development of the finishing art, such media included natural or synthetic stone, porcelain, abrasive filled clays, wood, leather, plastics, and the like. Ceramics have been popular in recent years, but are gradually being replaced by resin-bonded media due to cost factors. Whatever the type of finishing media employed, the parts to be refined or deburred are generally placed in a suitable finishing chamber together with the finishing media, which is of loose particulate nature, supports the parts, prevents undue collision thereof, and carries or supplies the abrasive which performs the surface finishing or deburring. Incorporation of the particulate abrasive material into a resin binder has become popular because the size and shape of the finishing chip can, in such case, be varied widely to suit individual requirements for dimensions, hardness, and the like, not only of the resin binder but also of the abrasive material incorporated therein. Precisely uniform shapes are attainable in the production of such media, but high-density chips, free of air bubbles, having minimum flash, and which are readily mass produced and simply and completely ejected from the mold in which made with a minimum of labor, for obvious purposes of economy, have not heretofore been available. Up until the present time, resin-bonded finishing chips have usually been individually cast or molded, with obvious disadvantages. Procedure for the production of ceramic or polymeric media by drop-wise feeding of thixotropic compositions from an orifice and thereafter hardening the same has been provided according to the procedure of U.S. Pat. No. 3,549,341, which goes into great detail concerning previous methods and disadvantages thereof. A continuous method of making abrasive finishing media or chips is also disclosed in U.S. Pat. No. 3,503,725, which involves the movement of gelatinous or uncured finishing material along a moving web, cutting the mass into suitable segments, and curing the individual segments to produce abrasive chips. Although both of these methods provide advantages over prior art procedure involving the individual molding or casting of pastelike ceramic or resin-bonded abrasive compositions, they still leave much to be desired from the standpoint of economy, flash reduction, elimination of air bubbles, and mass production of high-quality chips in a simple and convenient manner. Alternative existing procedure for the molding of finishing chips suffers from even greater disadvantages of excessive flash, excell labor costs, and incomplete ejection from the mold wherein produced. It is obvious that a simpler, more expeditious, and more economically-feasible method of mass producing finishing chips would be highly desirable and advantageous to the finishing industry. Such is provided according to the method and apparatus of the present invention, whereby high-density finishing chips, free of air bubbles and having a minimum of flash, may be readily mass produced and simply, completely and automatically ejected from the mold in which made with a minimum of labor and with a maximum of economy.

SUMMARY OF THE INVENTION

In summary, the invention comprises a method of producing finishing chips comprising the steps of providing a castable mixture of particulate abrasive grains and a solidifiable matrix, depositing the mixture into cavities of a generally-cylindrical, flexible mold having a plurality of cavities in the interior surface thereof conforming to the desired configuration of finishing chips to be produced, rotating said cylindrical mold during solidification of said mixture and the production of solid finishing chips within said cavities, and ejecting said solidified finishing chips from said mold by bringing said mold to an inside-out position, whereby said solidified finishing chips are ejected from said cavities, and such a method wherein castable mixture is deposited into the mold interior in a fluid, gelatinous, or semisolid state, wherein a pre-measured amount of castable mixture is distributed about the mold interior by rotation of the mold, wherein castable mixture is distributed about the mold interior with the assistance of a doctor blade, wherein castable mixture is solidified by application of heat, by air drying, or catalytically, wherein both mold cavities and finishing chips are tapered so as to provide a greater dimension at the chip base than at its top, wherein mold cavities and chips are generally triangular, conical or pyramidal, wherein said flexible mold is of rubber or elastomeric material and wherein said chips are ejected from said cavities by deforming said cavities so as to assume a greater dimension during the ejection step than during the molding step, wherein said solidified finishing chips are ejected from said mold while rotating said mold, wherein said mold is brought to an inside-out position by mechanical means, wherein said mold is brought to an inside-out position by means comprising mechanical means and hydraulic means, wherein said mold is brought to an inside-out position by means comprising pneumatic means, wherein said mold is restrained within a generally-cylindrical wall during solidification of said mixture, wherein said cylindrical mold is positioned as an inner lining of said cylindrical chamber during the chip-production step, wherein said mold is brought to an inside-out position outside of said generally-cylindrical wall for ejection of solidified chips from said cavities, wherein said mold has a bottom and is brought to an inside-out position outside of said cylindrical wall by pushing the bottom thereof outside of said cylindrical wall, wherein said mold has a bottom and is brought to an inside-out position outside the said cylindrical wall by exertion of air pressure against the bottom of said mold, wherein said cylindrical wall constitutes a portion of a generally-cylindrical chamber and said chamber is rotated about its central axis for rotation of said cylindrical mold therein, wherein said chip is a resin-bonded chip and said castable mixture is a mixture of solidifiable resin containing abrasive grains therein, and wherein said resin-bonded chip is a urea-formaldehyde resin-bonded chip and said castable mixture comprises an acid-catalyzed urea-formaldehyde resin and abrasive grain mixture.

The invention in summary also comprises apparatus which may be employed in carrying out the aforesaid method and suitable for the production of loose, particulate finishing chips for use in effecting vibratory, centrifugal, gyratory, or tumbling type finishing or the like, comprising: a generally-cylindrical wall mounted for rotation about a central axis, means for rotating said wall about said axis, a generally-cylindrical sheetform flexible mold, having a plurality of cavities therein conforming to the desired configuration of the finishing chips desired to be produced, affixed to said wall at the outer periphery thereof and adapted to be located in one of two locations, the first of which locations is inside of said wall and adjacent the inside surface of said wall, in which location said wall is in mold-supportive position and said mold is in chip-molding position, and the second of which locations is an inside-out location generally outside of said wall and extending outwardly from the periphery thereof, in which location said mold is in chip-ejecting position, and means for moving said flexible mold from said first location to said second location and vice-versa, and such apparatus wherein said wall is supported on a shaft, and including means supporting said shaft for rotation and means for driving said shaft, wherein said wall is a part of a chamber including a bottom, wherein said mold constitutes an inner lining of said wall when in said first position and is not attached internally inside of said cylindrical wall, wherein said flexible mold is of rubber or elastomeric material, wherein said rubber or elastomeric material is of such a nature as to impart the cavities therein in said first location with one dimension and in said inside-out location with a greater dimension, wherein said flexible mold is of silicone rubber, wherein said mold is provided with a bottom, wherein the means for moving said mold from said first location to said second location and vice-versa comprise mechanical means, wherein said mechanical means are actuated by associated hydraulic means, wherein said means for moving said mold from said first location to said second location and vice-versa comprise pneumatic means, wherein said shaft is a hollow shaft, wherein said wall is a part of a chamber having a bottom, said hollow shaft is affixed to said chamber bottom, and wherein said flexible mold is itself provided with a bottom, wherein said means for moving said mold comprise an inner shaft movable longitudinally within said hollow shaft, attached to said mold bottom, and adapted to be actuated to move said mold from said first position to said second position and back again, wherein said inner shaft is adapted to be moved by hydraulic means associated with said shaft, wherein longitudinal movement of said inner shaft is controlled by means of a thrust collar on said inner shaft, wherein said inner shaft is adapted to rotate along with said outer hollow shaft, wherein counterbalance means is affixed to said hollow shaft on the opposite side of said support means from said chamber, wherein said means for moving said mold comprise pneumatic means associated with said hollow shaft for generating pressure or vacuum through said hollow shaft and against said mold bottom, and wherein said chamber comprises a perforated baffle adjacent but spaced from its bottom for support of said mold bottom.

In summary, the apparatus may be more generally referred to as comprising a generally-cylindrical flexible mold having a plurality of cavities in the interior surface thereof conforming to the configuration of chips to be produced, means for rotating said mold during solidification of said mixture and production of solid finishing chips within said cavities, and means for ejecting said solidified finishing chips from said mold by bringing said mold to an inside-out position, whereby said chips are ejected from said cavities, preferably: said mold being restrained within a generally-cylindrical wall supported for rotation, said mold having a bottom and said ejecting means comprising means for bringing said mold to an inside-out position outside of said wall by pushing the bottom thereof outside of said wall or by exertion of air pressure against said mold bottom, said wall constituting a portion of a chamber having means for rotation about its central axis for rotation of said mold therein, said mold being of rubber or elastomeric material of such a nature as to impart the cavities therein with one dimension during solidification and production of chips and with a greater dimension in inside-out ejecting position, and said mold cavities being tapered so as to provide a greater dimension at the chip base than at its top.

OBJECTS OF THE INVENTION

Objects of the invention are to provide: an improved method and apparatus for the mass-production of finishing chips or pellets; such method and apparatus which involve the centrifugal casting of finishing chips in a substantially sheetform mold comprising a plurality of mold cavities within which the chips solidify, harden, or cure during the centrifugal casting operation; such method and apparatus whereby solidified chips are ejected from mold cavities by turning the mold "inside-out"; such method and apparatus wherein the said ejection of solidified chips can be effected automatically; such method and apparatus whereby high-density chips, free of air bubbles and having a minimum of flash, may be readily mass-produced and simply, completely and automatically ejected from the mold in which made, all with a minimum of labor and a maximum of economy. Other objects of the invention will become apparent hereinafter and still others will be obvious to one skilled in the art.

DESCRIPTION OF PREFERRED EMBODIMENTS OF THE INVENTION

The invention, in several preferred embodiments, is illustrated by the accompanying drawings, in which:

FIG. 1 is a partial cross-sectional view of apparatus according to the invention, taken along line I—I of FIG. 4, in make-ready stage, showing a flexible mold with compound-containing cavities therein.

FIG. 2 is a partial cross-sectional view of a flexible mold according to the invention in reversed or "inside-out" position, taken along line II—II of FIG. 4, showing ejection of finishing chips therefrom.

FIG. 3 is a perspective view of a finishing chip or pellet produced according to the invention.

FIG. 4 is a side view, partially broken away and partially in section, of a centrifugal casting apparatus according to the invention.

FIG. 5 is a side view, partially in section, of alternative centrifugal casting apparatus according to the invention.

FIG. 6 is an enlarged cross-sectional view of a mold cavity in a flexible mold according to the invention in molding position with finishing chip therein.

FIG. 7 is an enlarged cross-sectional view of a mold cavity in a flexible mold according to the invention in ejection position with finishing chip being ejected therefrom.

FIG. 8 is a key to the dimensions a through d employed in FIGS. 6 and 7.

SPECIFIC REFERENCE TO THE DRAWINGS

Reference is now made to the accompanying drawings for a better understanding of the invention, wherein all the essential parts are numbered and wherein the same numbers are used to refer to corresponding parts, or wherein the same numbers but differing by a factor of one-hundred (100) are used to refer to corresponding parts.

In a preferred form, the apparatus of the invention is shown in FIG. 4. An alternative apparatus, which employs pneumatic means for ejection of the formed finishing chips from the flexible mold, rather than mechanical means, is shown in FIG. 5. The rotatable chamber, within which the flexible mold according to the invention is located, when the apparatus is in molding position, is shown generally in FIGS. 4 and 5 at 10 and 110. The rotatable chamber, which is rotatable about its central axis, is shown in the form of an open-ended annular drum having mold-supportive sidewalls 13 and 113. Such drum may representatively have an internal diameter of slightly more than sixty (60) inches (1524 millimeters) to accommodate the essentially sheet-form flexible mold of approximately such dimensions within the interior chamber thereof. In molding position, shown in unbroken lines in FIG. 4, the flexible mold 11 is located inside drum 10, lies closely adjacent to mold-supportive drum wall 13, and is advantageously provided with bottom 17. As shown in chip-ejecting position in FIG. 4 by dotted lines, when ejecting formed and solidified finishing chips, the flexible mold 11 is extended outwardly from the outer rim or periphery of drum 13, to which it is attached along its circumference, then being in inside-out condition, with the mold cavities 12 facing outwardly, rather than inwardly as is the case when mold 11 is in molding mode or position within drum 10.

As shown in FIG. 1, which is a cross-section taken along line I—I of FIG. 4, in molding position the flexible mold 11 of the invention lies closely adjacent to mold-supportive wall 13 of drum 10. As the drum is rotated about its central axis, a pre-measured amount of compound 14, comprising a mixture of matrix and abrasive, is introduced into the mold. Since the compound 14 is generally in semi-solid, gelatinous, or fluid condition at this point and has a viscosity which allows it to move readily within the mold interior, to the surface of which it adheres due to the centrifugal force imparted by rotation of drum 10, it locates itself conveniently and rapidly within mold cavities 12. As shown in FIG. 1, a scraper or "doctor" blade located interior of the rotating chamber 10 may be used to assist in the more convenient and rapid location of compound 14 within the mold cavities 12 and for the removal of any excess compound 14 which may be present.

After completion of the rotation and molding or casting cycle, during which the compound 14 is compressed into the mold cavities 12 by centrifugal force, and allowed to solidify, the flexible mold 11 is turned inside out for ejection of the hardened finishing chips or pellets 15 from the mold cavities 12.

During the rotation of molding stage, the centrifugal force generated by the rotation is able to exert its full force and effect upon the hardening chips 15 in cavities 12 due to the mold-supporting or "backup" effect of wall 13 which lies in juxtaposition to and in contact with flexible mold 11.

As shown in FIGS. 6 and 7, and as explained in the key of FIG. 8, when the flexible mold 11 with its plurality of mold cavities 12 is in molding position, the base "a" of the chip is compressed within base "b" of the mold cavity 12, which is essentially of the same dimensions as the base "a" of the finishing chip being formed. As shown, the finishing chip is of pyramidal shape, having a greater circumference at its base than at its top, and has a height identified as "d". Conversely, when the flexible mold of the invention is in ejecting position, as seen in FIG. 7, due to the flexibility of the mold material employed, which is preferably natural or synthetic rubber or other elastomer, especially when under pressure or when rotating, the finishing chips or pellets 15 are readily disengaged from the mold cavities 12, inasmuch as the outer diameters "c" constituting the bases of the mold cavities 12 assume dimensions larger than "b" for ready and convenient ejection of the solidified and hardened finishing chips from the mold cavities 12.

FIG. 2 shows the ejection of finishing chips or pellets 15 from the mold cavities 12 in flexible mold 11 during an ejection cycle, FIG. 2 constituting a cross-sectional view of the "inside out" mold along line II—II of FIG. 4.

FIG. 3 shows a conical or pyramidal finishing chip or pellet 15 produced according to the present invention, having a greater diameter across its base "a" than at its top and having a height "d", as more particularly shown in FIGS. 6 and 7. This particular configuration of finishing chip or pellet, while preferred, is only one of innumerable shapes or forms which may be conveniently produced according to the method of the invention and using the apparatus of the present invention.

FIG. 4 shows in detail and partial schematic a complete apparatus of the present invention which may be employed for the convenient production of finishing chips or pellets. A rotatable chamber in the form of an open-ended cylindrical drum is generally shown at 10 and has sidewall 13 and bottom 16 supported by radial supports 23, central core 24, and appropriate weldments. Sidewall 13 has flange 21, to which is attached corresponding flange 22 of the flexible mold 11 which, when in molding mode or position, in effect constitutes an inner lining of the drum 10. Flexible mold 11 is secured to bottom 17, thereby constituting an entire inner lining for drum 10 when in interior molding mode or position. Drum 10 is secured by central core 24 to hollow outer shaft 26, which is journaled for rotation in bearings not shown in the interior of the upper section of stanchion 27 which, along with stanchion 37, supports the apparatus as a whole. Outer hollow shaft 26 carries pulley 28 affixed thereto which, together with pulley 29, connecting belt 30, and driving motor 21, provides the means for rotating shaft 26 and drum 10 carried thereby. Counterbalance 32 is shown affixed to the opposite end of shaft 26 for counterbalancing drum 10 at the other side of stanchion 27.

Mold bottom 17 is securely affixed to interior shaft 33, which is separated interiorly from outer hollow shaft 26 by seal 25, but which is secured for rotation together with hollow outer shaft 26 by corresponding interlocking of mutually engaging means not shown on the outside of inner shaft 23 and the inside of outer shaft 26. At the end of inner shaft 33 opposite the end secured to the bottom 17 of mold 11 is affixed thrust collar 34, in turn associated with two-way hydraulic thrust and return means 35, 36, and 38, in turn connected by hoses 39 and 40 to a fluid source not shown and associated switches for activating the same either for outward thrusting for chip ejection or return for a further molding cycle.

The dotted lines in FIG. 4 show the flexible mold 11 of the invention in ejecting mode or position, with inner shaft 33 and mold bottom 17 thrust outwardly to the full extent enabled by thrust collar 34 for the purpose of ejecting the solidified and hardened finishing chips or pellets from the cavities 12 of mold 11, and show the finished chips 15 being collected en masse in a suitable container.

In the alternative structure shown in FIG. 5, flexible mold 111 having mold cavities 112 is shown secured to open-ended drum 110 by means of rivets 122 along peripheral flange 121 extending entirely around the circumference of drum 110 at the outer edge of wall 113. As shown in solid lines, the mold is in ejecting position. Dotted lines show the flexible mold 111 in molding mode or position, in which mode the flexible mold lies closely against wall 113 of drum 110 and, with its bottom 117, forms a complete inner lining for drum 110. Bottom 117 lies in molding mode against baffle 119 having openings 120 therethrough, which baffle is secured by circular brace 118 to drum bottom 116, which is in turn secured to hollow shaft 126 by radial supports 123 and appropriate weldments. Hollow shaft 126 is journaled in two-way thrust bearings, not shown, in the upper portion of stanchion 127, whereas the opposite end of hollow shaft 126 is lodged in seal 141 at the upper extremity of stanchion 137. Said seal, while permitting rotation and a buildup of pressure within hollow shaft 126, also prevents the inadvertent or accidental creation of air currents or vacuum within hollow shaft 126. Pulley 128 and associated belt 130 are in turn associated with a motor and additional pulley, not shown, for rotation of shaft 126 and drum 110 secured thereto, as well as counterbalance 132 secured to shaft 126 on the other side of stanchion 127. Fluid connector 142 leads into seal 141 and attached hosing 143 is associated with a source of air and vacuum and appropriate switch means, not shown.

According to the embodiment shown in FIG. 5, flexible mold 111 is turned inside out by the employment of air pressure released through hosing 143, connector 142, seal 141, and along hollow shaft 126, through openings 120 in baffle 119, thereby forcing flexible mold 111 from its molding mode or position into its ejecting position, as shown in FIG. 5. In contrast to the apparatus of FIG. 4, the means for forcing the flexible mold into ejecting position is entirely of a pneumatic nature, rather than of a mechanical nature, namely, the interior pusher or piston rod 33 and associated bottom 17 of the apparatus shown in FIG. 4. Whereas, in the apparatus of FIG. 4, for replacement of the flexible mold into a further molding mode or position, it is only necessary to activate the hydraulic means to return position, thereby retracting interior pusher or piston rod 33 and bringing the flexible mold 11 back into a "lining" or molding mode or position, according to the embodiment of FIG. 5 this same effect is produced simply by switching from air pressure to vacuum, which in turn reverses the flow of air through seal 141 and in hollow shaft 126, whereby bottom 117 of flexible mold 111 is suctioned back into "lining" or molding mode or position against sidewall 113 and baffle 119 of the rotatable drum 110.

OPERATION OF THE APPARATUS

In operation, the fluid, gelatinous, or semi-solid mixture of matrix and abrasive, i.e., compound 14, is loaded into the interior of drum 10 or 110 with the flexible mold 11 or 111 in "lining" position interior thereof and ready for the molding operation. The amount of mixture or compound 14 is conveniently pre-measured and is generally readily distributed in the liquid or viscous state into mold cavities 12 or 112. This distribution and the removal of any excess may be facilitated by the employment of a doctor blade such as 16, as shown in FIG. 1, which may be inserted into the interior of drum 10 or 110 and which may be hand held, otherwise supported, or automatic, according to usual procedure for the employment of doctor blades, as is well known in the art. Whether the mixture or compound 14 is to be cured by air drying, catalyzation, or heat, or combinations of the same, it is in any event a castable material of sufficient fluidity and adequate viscosity to enable ready distribution within the flexible mold 11 or 111 upon rotation of the drum 10 or 110, with or without the employment of a doctor blade such as 16. Upon rotation of the chamber 10 or 110, containing the flexible mold 11 or 111 in molding position therein, for a sufficient period, e.g. for fifteen (15) minutes, the finishing chips or pellets 15 within mold cavities 12 or 112 are sufficiently set or cured so that the ejection cycle can be commenced. This ejection cycle can be carried out easily with drum 10 or 110 either in stationary or in rotating condition, with the ejection being somewhat more controllable when it is carried out with the drum in stationary or relatively stationary condition. On the other hand, when ejection is carried out with drum 10 or 110 rotating, the ejection of pellets 15 from mold cavities 12 or 112 is considerably faster and more complete.

In any event, at the end of the molding cycle, flexible mold 11 or 111 is turned inside out and brought to its second or ejection position, thereby to eject the solidified finishing chips or pellets 15 from mold cavities 12 or 112, whereupon they may be caught in a suitable container as shown, deposited upon an endless belt, or collected in any other suitable manner. If additional time is required for curing, this can be provided after ejection of the solidified finishing chips or pellets 15 from the mold. As shown, these pellets 15 are tapered from their bottom to their top to facilitate ejection from the mold and, also as shown, are in pyramidal shape or form. Such shapes or forms wherein the finishing chips are tapered from their base to their top are preferred for obvious reasons of facilitating ejection from the mold, although innumerable other shapes or forms may be imparted to the finishing chip or pellets with facility depending only upon the shape of the mold cavities 12 or 112. Ejection from the mold presents no problem, requiring only that the flexible mold 11 or 111 be sufficiently flexible to eject the solidified finishing chip or pellet therefrom after molding and solidification thereof.

Flexible mold 11 or 111 can, of course, be turned inside out and/or returned to its "lining" and molding position within the drum 10 or 110 by hand, if desired, with some inconvenience or by using an appropriate handle not shown which is attached or attachable to the bottom of the mold 17 or 117, or in any other suitable manner, but the means shown in FIGS. 4 and 5 and previously described is far preferable and has proved extremely useful in practice.

The flexible mold may, as previously stated, be of any desired composition, such as natural or synthetic rubber or other elastomer, or any other flexible material suitable for the formation of a plurality of mold cavities therein. A material such as silicon rubber has been found to be extremely useful in practice. The material should, of course, according to the preferred embodiment of the invention, be of sufficient flexibility so that, when in the ejection mode for ejection of solidified finishing chips or pellets therefrom, especially upon rotation and/or under pressure from within, the mold cavities located in the surface thereof assume greater dimensions than they possess originally, e.g., when they are in the molding position, thereby to facilitate ejection of the solidified finishing chips or pellets from the mold cavities. Thus, as shown in FIGS. 3, 6, and 7, the diameter of the mold cavities during ejection is larger than their original diameter during molding, with the effect that this increase in circumference actually serves to "pop-out" the solidified finishing chips or pellets from the cavities during the ejection mold or step.

According to the embodiment shown in FIG. 4, after completion of the molding, including solidification, cycle, for conversion into the ejection cycle, hydraulic means 35, 36, 38 is activated, thereby forcing inner shaft 33, affixed to flexible mold bottom 17, through seal 25 and longitudinally within outer hollow shaft 26 to the full extent permitted by thrust collar 34, thereby forcing flexible mold 11 and its bottom 17 into the position shown by dotted lines in FIG. 4. After all finishing chips or pellets 15 are ejected, the "inside ou" flexible mold 11 is then returned to its "lining" or molding position by simple reversal of hydraulic means 35, 36, and 38, thereby reversing the path of travel of inner shaft 33 inside of outer hollow shaft 26, to its original position, thereby returning flexible mold bottom 17 to its original position within drum 10 adjacent to drum bottom 16. In this position, flexible mold 11 and its ancillary equipment for the centrifugal casting of finishing chips or pellets 15 is ready for commencement of a further molding operation.

According to the embodiment shown in FIG. 5, for ejection of finishing chips or pellets 15 from the cavities 112 of flexible mold 111, the same procedure is employed. In the position shown in solid lines in FIG. 5, the flexible mold 111 and its bottom 117 are shown in extended or ejection position, outside of drum 110. This position is attained after completion of a suitable molding, including solidification, cycle, merely by activating air flow through bore 143, connector 142, seal 141, and through the interior of hollow shaft 126. The air pressure thus generated proceeds into drum 110 and through openings 120 in baffle 119 against the bottom 117 of flexible mold 111, forcing it outwardly into ejecting position as shown in solid lines in FIG. 5. According to this embodiment, when it is desired to reinstitute the molding cycle and return the flexible lining 111 into "lining" or molding position within drum 110, it is a simple matter to switch hose 143 to a source of vacuum, thereby providing through connector 142, seal 141, and hollow shaft 126 a vacuum which operates through openings 120 in baffle 119 and against flexible mold bottom 117 in precisely the reverse order, bottom 117 thereby being drawn back within walls 113 of drum 110 and being once more located against baffle 119 and walls 113 for commencement of another molding cycle.

Thus, the difference between the embodiments of FIG. 4 and FIG. 5 is fundamentally that the embodiment of FIG. 4 employs mechanical means, namely, inner shaft 33 attached to movable bottom 17 of the flexible mold for purposes of ejection, whereas the embodiment of FIG. 5 employs pneumatic means, namely, either air pressure or vacuum, for moving the flexible mold 111 and its bottom 117 into ejecting position and restoring it to a "lining" or molding position, respectively, the operation of the two embodiments being otherwise essentially the same.

The following specific example is given by way of illustration only, and is not to be construed as limiting.

A fluid compound or mixture of abrasive grains and matrix was prepared by mixing ten (10) micron silica into a urea-formaldehyde resin in the liquid state, which was subsequently catalyzed with an acid in the usual manner for solidification of urea-formaldehyde resins. The mixture was then poured into a rotating flexible mold in the apparatus depicted in FIG. 4, the interior of which mold was lightly scraped with a doctor blade for one minute to distribute the mixture uniformly into the mold cavities throughout the full inner circumference of the mold. The rotation of the mold within the drum was continued for a period of fifteen (15) minutes, whereafter the mold was turned inside out as previously described for ejection of the solidified finishing chips or pellets. In a test conducted while the flexible mold was rotating inside of its supporting rotating drum, the ejection was extremely rapid and complete. In a further test, wherein the rotation was stopped prior to ejection, the elapsed time for ejection was greater and the degree of ejection was less complete. In both cases, however, the finishing chips or pellets were readily ejected in a sufficiently solidified state so that they could be readily collected and allowed to air cure over a further extended period.

The finishing chips or pellets thus prepared were found to be entirely suitable for use in the finishing of parts, for example, for finishing the surface of zinc die castings by either tumbling or vibratory finishing, as in a Spiratron ® helical vibratory finishing device or in a centrifugal finishing device such as the Rotomax ™. The production of additional embodiments of finishing chips according to the present process and in the present apparatus results in chips of a similar nature suitable for employment in finishing the surfaces of various parts including aluminum castings, aluminum machined parts, various steel machined parts, steel stampings, punchings and forgings, ceramics, and the like. The size of the representative pyramidal chips produced in the foregoing example and employed as set forth in the foregoing is $\frac{3}{8}$ inch diameter at base $\times 5/16$ inch in height, although innumerable other shapes and sizes can be produced, including, for example, triangles $1\frac{1}{8}''\times\frac{3}{8}''\times\frac{1}{8}''$, $1\frac{1}{8}''\times\frac{3}{8}''\times\frac{1}{4}''$, $\frac{3}{8}''\times 7/16''\times\frac{1}{4}''$, et cetera, as well as various other shapes and forms other than pyramidal or conical, such as spherical or cylindrical, and having numerous other cross-sections, e.g., elliptical, rectangular, circular, or triangular, as typical examples, it being understood that forms or shapes having greater dimensions at their bases than at their top or apex are preferred from an ease of ejectment standpoint.

In cases where a heat cure is desirable, it has been found that solidification and curing of the finishing chips or pellets can be facilitated by directing a stream of hot air interior of the flexible mold inside its rotating drum during the molding and curing procedure. Alternatively, after ejection of solidified finishing chips or pellets, the same can be subjected to a stream of hot air on a movable belt from an overhead source, if desirable, for a complete and extremely rapid cure. Alternatively, in the production of finishing chips involving catalytic reaction or simple air drying, the cure may be effected completely by or during the centrifugal casting process within the drum while rotating, without the necessity for continued air drying or application of heat.

In all cases, the finishing chips or pellets produced have been found to be of uniform nature, of high density and without air bubbles, and of high quality, with little or no scrap or flash being produced due to the possibility of introducing predetermined amounts of the compound or mixture into the mold. Perhaps the greatest advantage of the present process and apparatus is one of economics, since an extremely small amount of labor is involved. Such scraping as may be necessary or desirable in carrying out the molding operation is not time consuming, inasmuch as a predetermined amount of the compound or mixture can be introduced into the mold and because the mixture distributes itself rapidly into the mold cavities due to its suitable viscosity and rotation of the mold itself, whereas ejection of the finishing chips or pellets from the mold can be entirely automatic, as previously described, and can even be computer-programmed so as to be carried out a predetermined time after the commencement of each molding cycle.

It is clear that the method of the invention and the apparatus of the invention can be employed not only with urea-formaldehyde systems, but that it can also be employed with polyester systems, or any other system involving a castable material or matrix which, when considered as a "compound" together with the abrasive grains therein, can be cast in the fluid, gelatinous, or semi-solid state, and which will heat cure, dry, or catalyze to solidify, harden, set, or cure. It is obvious that any suitable kind of abrasive grain may be employed in producing the finishing chips or pellets according to the invention, such as, for example, innumerable silica sand, aluminum oxide, silicon carbide, bauxite, vocanic ash, or tripoli abrasive grains, or the like. Although the method and apparatus of the invention can be employed with any castable system, whether ceramic, plastic, or otherwise, it should be apparent that a preferred embodiment thereof involves the casting of plastic-bonded finishing media of the type now extremely popular in the deburring, cleaning, descaling, burnishing, finishing, and polishing of parts or workpieces in centrifugal, vibratory, gyratory, or rotating (tumbling) apparatus, or an apparatus providing a combination of such actions, all as previously stated.

By "finishing material", "finishing media," "finishing medium," "finishing chips," or "finishing pellets," as these terms may be used interchangeably herein, it is intended to include such materials as exemplified by FIG. 3 hereof, which serve as loose, particulate, and solid finishing materials of the type presently employed in the trade and others of a similar nature. Moreover, these terms are used herein generally to designate such solid materials which are used to impart all types of finishes including those finishes acquired with abrading materials as well as with polishing materials, polishing being considered in its usual sense as one species of finishing.

The method and apparatus of the present invention have many advantages over conventional procedure and equipment of the art. Among these are the following: uniform chips of high density and without the presence of air bubbles, a major problem especially with small chips, and of the highest quality due to effective centrifugal force during casting: little or no scrap or flash, due to the possibility of employing predetermined amounts of matrix-abrasive mixture in each molding cycle; and extremely good economics, in view of the absence of manual labor requirements, loading and scraping to the extent necessary being extremely rapid because of the ability to employ predetermined amounts of abrasive-matrix mixture and rapid distribution of compound within the mold and mold cavities even without scraping due to rotation of the mold, whereas ejection is automatic.

Although the flexible mold as shown in the drawings is supported by a cylindrical wall mounted for rotation about a central axis, in the form of a cylindrical chamber supported on a shaft for rotation, with means supporting the shaft for rotation and means for driving the shaft for rotation of the chamber wall, numerous modifications may be made without departing from the invention. It is only necessary that the cylindrical flexible mold be rotated during solidification of compound therein for production of solid finishing chips within the mold cavities, and it is only necessary in the apparatus of the invention that the cylindrical wall be capable of rotation about a central axis by any suitable means. Although the cylindrical wall supporting the cylindrical sheetform flexible mold in the apparatus of the invention provides considerable support for the exterior surface of the flexible mold, so that centrifugal force imparted by rotation can exert its full force and effect upon compound in the mold cavities, thereby permitting attainment of highest density and elimination of air bubbles from the compound and the corresponding finishing chips produced, this is a preferred embodiment which is not always essential to the method of the invention.

In addition, although the flexible mold shown and described is always "generally cylindrical", as is any surrounding wall, it is not essential that the mold, the surrounding wall, or the chamber of which said surrounding wall may be a part, be cylindrical in any precise usual sense of the term. It is only necessary that the flexible mold and any surrounding wall be "generally cylindrical," that is, insufficiently cornered so as to prevent the free flow of starting fluid, gelatinous, or semi-solid compound or mixture therein and around the interior of the mold. For example, the generally-cylindrical flexible mold, any surrounding wall, and any chamber of which the wall is a part, may have a decagonal, octagonal, hexagonal, or pentagonal cross-section, or any other cross-section which does not detract from its generally-cylindrical nature or interfere with the flow of compound or mixture about the interior of the mold for rapid filling of the mold cavities therein or with rotation thereof about an essentially central axis. Although for purposes of ultimate convenience and operating efficiency a true cylinder is preferred, other generally-cylindrical molds and supporting walls may be employed with equal or only somewhat reduced efficiency, as will be apparent to one skilled in the art.

When the mold is herein referred to as being brought to "an inside-out position" for purposes of ejecting solidified finishing chips from the cavities of the said mold, it is to be understood that said inside-out condition may be either complete or partial, depending upon the exact manner of operation desired. It is obvious that the mold is not turned completely inside out in the sense that it generally remains attached to the outer periphery of the supporting wall, when the apparatus of the invention is employed, and that the mold may be pushed or forced only partially as well as nearly completely from within the confines of any supporting wall wherein it resides during the molding operation. In any event, it is to be understood that the inside-out position of the mold for chip-ejection purposes may be any desired degree of reversal from partial to complete, as at the time may appear desirable to the operator of the method or apparatus of the invention.

It is to be understood that the invention is not to be limited to the exact details of construction, operation, or exact materials or embodiments shown and described, as obvious modifications and equivalents will be apparent to one skilled in the art, and the invention is therefore to be limited only by the full scope of the appended claims.

I claim:

1. Method of producing finishing chips comprising the steps of providing a castable mixture of particulate abrasive grains and a solidifiable matrix, depositing the mixture into cavities of a generally cylindrical flexible mold having a plurality of cavities in the interior surface thereof conforming to the desired configuration of finishing chips to be produced, rotating said cylindrical mold during solidification of said mixture and the production of solid finishing chips within said cavities, and ejecting said solidified finishing chips from said mold by bringing said mold to an inside-out position, whereby said solidified finishing chips are ejected from said cavities.

2. The method of claim 1, wherein castable mixture is deposited into the mold interior in a fluid, gelatinous, or semi-solid state.

3. The method of claim 2, wherein a premeasured amount of castable mixture is distributed about the mold interior by rotation of the mold.

4. The method of claim 3, wherein castable mixture is distributed about the mold interior with the assistance of a doctor blade.

5. The method of claim 2, wherein castable mixture is solidified by application of heat, by air drying, or catalytically.

6. The method of claim 1, wherein both mold cavities and finishing chips are tapered so as to provide a greater dimension at the chip base than at its top.

7. The method of claim 6, wherein mold cavities and chips are generally triangular, conical or pyramidal.

8. The method of claim 1, wherein said flexible mold is of rubber or elastomeric material and wherein said chips are ejected from said cavities by deforming said cavities so as to assume a greater dimension during the ejection step than during the molding step.

9. The method of claim 1, wherein said solidified finishing chips are ejected from said mold while rotating said mold.

10. The method of claim 1, wherein said mold is brought to an inside-out position by mechanical means.

11. The method of claim 1, wherein said mold is brought to an inside-out position by means comprising mechanical means and hydraulic means.

12. The method of claim 1, wherein said mold is brought to an inside-out position by means comprising pneumatic means.

13. The method of claim 1, wherein said mold is restrained within a generally cylindrical wall during solidification of said mixture.

14. The method of claim 13, wherein said cylindrical mold is positioned as an inner lining of said cylindrical chamber during the chip-production step.

15. The method of claim 13, wherein said mold is brought to an inside-out position outside of said generally cylindrical wall for ejection of solidified chips from said cavities.

16. The method of claim 13, wherein said mold has a bottom and is brought to an inside-out position outside of said cylindrical wall by pushing the bottom thereof ouside of said cylindrical wall.

17. The method of claim 13, wherein said mold has a bottom and is brought to an inside-out position outside the said cylindrical wall by exertion of air pressure against the bottom of said mold.

18. The method of claim 13, wherein said cylindrical wall constitutes a portion of a generally cylindrical chamber and said chamber is rotated about its central axis for rotation of said cylindrical mold therein.

19. The method of claim 2, wherein said chip is a resin-bonded chip and said castable mixture is a mixture of solidifiable resin containing abrasive grains therein.

20. The method of claim 19, wherein said resin-bonded chip is a urea-formaldehyde resin-bonded chip and said castable mixture comprises an acid-catalyzed urea-formaldehyde resin and abrasive grain mixture.

* * * * *